Figure 1:
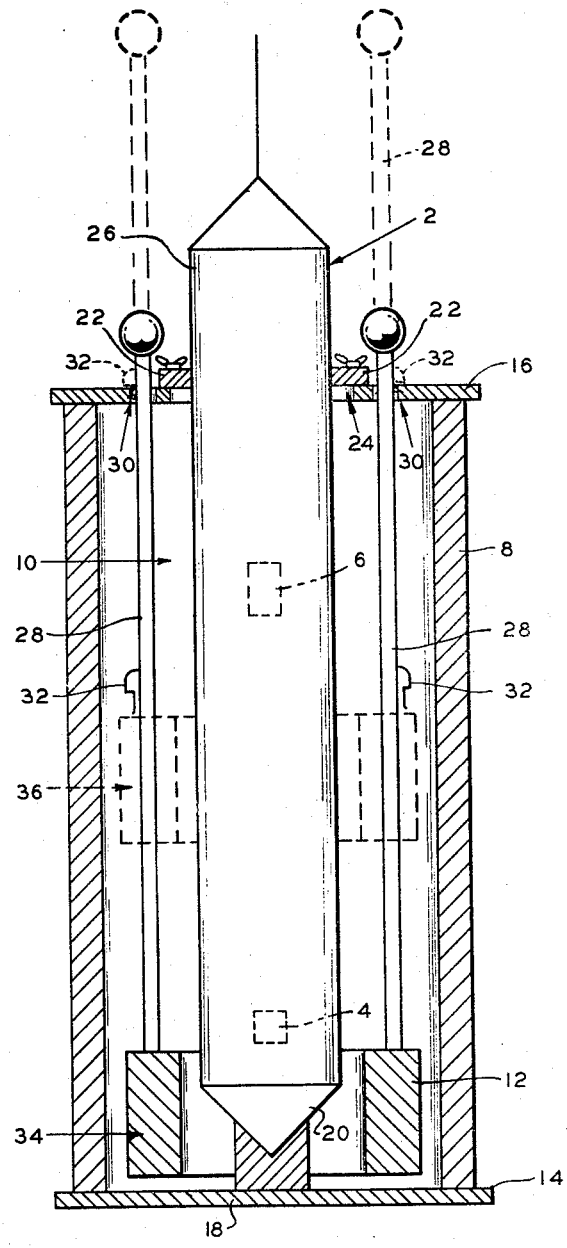

INVENTORS
GILBERT SWIFT
DALE E. BARKALOW 2,945,129
Patented July 12, 1960

2,945,129
CALIBRATOR FOR RADIOACTIVITY WELL LOGGING INSTRUMENTS

Gilbert Swift and Dale E. Barkalow, Tulsa, Okla., assignors to Well Surveys, Incorporated, a corporation of Delaware Filed Aug. 16, 1956, Ser. No. 604,355
12 Claims. (Cl. 250—83)

This invention relates to radioactivity well logging and is particularly directed to novel methods and apparatus for calibrating radioactivity well logging instruments.

In the art of radioactivity well logging, extremely minute differences in radiation intensities may have important meanings. Consequently, highly sensitive instruments must be employed and these instruments must be calibrated frequently to enable accurate interpretation of logs made by such instruments.

With gamma ray sensitive instruments which do not employ their own source of radiation, this is not too difficult a problem and calibration may be accomplished merely by placing a standard gamma ray source of known intensity adjacent the detector and noting the difference in instrument response with this source applied and removed. This method may also be used to check for defects in the detector or electronic systems of gamma ray sensitive instruments which do employ their own source of radiation. However, this method does not provide complete calibration of the latter type of gamma ray sensitive instruments and is most unsatisfactory for neutron sensitive instruments.

In calibrating instruments which include a source of radioactivity for inducing radiation from the formations surrounding the well, it is essential that this source, commonly called a "logging source" be employed in the calibration. It is extremely difficult to produce identical radiation sources. Thus, sources having the same rating may actually vary in intensity by as much as ten percent. Moreover, the exact position of the source will vary from instrument to instrument and may have a strong effect on the instrument response. Consequently, unless the peculiarities of the logging source are taken care of in the calibration of the instrument, they will affect any log made with the instrument and logs made with different sources may have little relation to each other.

Furthermore, with instruments which detect only neutrons or both neutrons and gamma rays, calibration is much more difficult. Unfortunately, most neutron detectors are capable of detecting only neutrons of thermal or epithermal velocities whereas neutron sources emit only fast neutrons. Consequently, a neutron source placed adjacent a neutron detector has little or no effect on the detector. Moreover, most neutron sources also emit gamma rays in quantities equal to or greater than the quantities of neutrons emitted and most neutron detectors are somewhat sensitive to gamma rays. However, the relative intensities of the gamma ray and neutron fluxes may vary from source to source and may change with time while the relationship of the sensitivity to either radiation may vary from detector to detector. Thus, it has not been possible, heretofore, to calibrate instruments which detect primarily slow neutrons and measurements have been made in the blind hope that all of these factors would remain sufficiently constant so as to permit interpretation of the logs.

These disadvantages of prior art calibration methods and apparatus are overcome with the present invention and novel methods and apparatus are provided which permit rapid, accurate and complete calibration of any induced radiation type instrument, that is, any instrument which includes a source, regardless of whether the source emits gamma rays, neutrons, or other radiations. The apparatus is easy to handle and extremely simple to operate. Moreover, the device of the present invention employs the logging source as the calibrating source. Thus, any peculiarities in the source will be neutralized by the calibration. In addition, the calibrator of the present invention approximates the conditions actually found in a well. Consequently, a more valid calibration is obtained than with the standard source calibration employed heretofore for gamma ray sensitive instruments.

The advantages of the present invention are preferably attained by providing a novel calibrator comprising a tube composed of material having a high radiation scattering cross section for receiving an instrument to be calibrated and having a sleeve composed of material having a high radiation capture cross section arranged to encircle the instrument within the tube and movable axially from one position to another to alter the flux of radiation reaching the detector due to the source.

Accordingly, it is an object of the present invention to provide novel methods and apparatus for calibrating radioactivity well logging instruments, particularly neutron well logging instruments.

Another object of the present invention is to provide novel methods and apparatus for calibrating induced radiation type well logging instruments wherein the logging source is employed as the calibration source.

An additional object of the present invention is to provide novel methods and apparatus for calibrating radioactivity well logging instruments under conditions approximating those found in a well.

A specific object of the present invention is to provide a tube composed of material having a high radiation scattering cross section to receive an instrument to be calibrated and having a sleeve composed of material having a high radiation capture cross section arranged to encircle said instrument within the tube and movable from one position to another to alter the flux of radiation reaching the detector due to the source.

These and other objects and features of the present invention will be apparent from the following description wherein reference is made to the figure of the accompanying drawing.

In the drawing:

Fig. 1 is a vertical section through a typical calibrator embodying the present invention and showing an instrument in position for calibration.

In that form of the invention chosen for purposes of illustration in the drawing, Fig. 1 shows an induced radiation type well logging instrument 2 to be calibrated having a source of radiations 4 and a radiation detector 6.

The calibrator comprises a tube 8 having an opening 10 extending axially therethrough. The tube 8 is preferably of sufficient length to encompass both the source 4 and the detector 6 of the instrument 2, while the diameter of the opening 10 should be large enough to accommodate the instrument 2 and to permit a tubular sleeve 12 to encircle the instrument 2 and to move axially thereof within the tube 8.

The opposite ends of the tube 8 are preferably covered by a base 14 and a top 16, and means are provided for centering the instrument 2 with respect to the tube 8. As seen in Fig. 1, the centering means comprises a recessed block 18 secured to the base 14 within the tube 8 and adapted to receive the lower end 20 of the instrument 2 and to maintain it concentric with the tube 8. In addition, a pair of clamping blocks 22 are adjustably secured on opposite sides of an opening 24 in the top 16 through which the instrument 2 extends, and serve to center the upper end 26 of the instrument 2. Rods 28 may be provided which extend through openings 30 in the top 16 and are secured to the sleeve 12 to facilitate raising and lowering of the sleeve. Retaining means, such as spring clips 32, may be provided on the rods 28 to releasably secure the sleeve 12 in its raised position.

The tube 8 is preferably formed of a material which has a high scattering cross scetion for the type of radiation emitted by the source 4. This causes some of the radiation to be directed back toward the instrument in the vicinity of the detector and, in the case of neutrons, attenuates the energy of the radiation sufficiently to permit detection. In addition, when the tube is irradiated with neutrons, some gamma radiation will be induced. The sleeve 12, on the other hand, should be formed of a material which has a high radiation capture cross section. For instruments which detect the same type of radiation as is emitted from the source, such as neutron-neutron instruments, the sleeve 12 should be formed of material having a high capture cross section for this type of radiation. However, in instruments which detect a different type of radiation from that emitted by the source, for example, neutron-gamma ray instruments, the sleeve 12 may be formed to capture either type or both. In addition, if desired, two or more sleeves may be providde, each being formed to capture a different type of radiation. Moreover, the sleeve 12 should be adjustable from one position, shown in solid lines at 34 in Fig. 1, in which it has little or no effect on the radiations reaching the detector 6 to a second position, indicated in dotted lines at 36 in Fig. 1, where it influences the radiations reaching the detector 6.

The difference between the readings obtained with sleeve 12 in these positions will be determined largely by the material from which the tube 8 and sleeve 12 are formed. If the difference is too small, much time will be required to obtain a reading or the difference will be obscured by statistical error. On the other hand, if the difference is too large, it will be necessary for the operator to change the range of his instruments from a logging scale to a calibrating scale and vice versa. This introduces a possible source of human error, and it is entirely possible that the calibration of the one scale would not result in accurate calibration of the other scale. Obviously then, calibration of the instruments will be considerably more valuable if it is done with a difference similar to those actually encountered during well logging operations.

Since shale formations and limestone formations generally provide the extremes in radiation intensities in logging operations, it is proposed to adopt this range as the calibration scale. Specifically, the calibration difference should correspond approximately to the difference between shale and limestone of 15 percent porosity as found in an uncased, water-filled well having a diameter of 7 inches. Unfortunately, it is highly impractical to send instruments from all over the world to a central calibration well each time they are to be checked. Conversely, a calibration well having substantially infinite walls of shale and limestone obviously cannot be shipped from well to well. However, the same difference can be obtained with other materials, and by employing relatively small quantities of materials having a high scattering power or a high capture cross section for the desired radiation, a calibrator can be constructed which provides the desired difference while being readily portable.

Obviously, no single material or set of dimensions will yield these results for all types of radiations. Thus, for instruments employing a neutron source, it has been found that the tube 8 of the calibrator of Fig. 1 should be formed of material having a slowing down power for neutrons approximately equal to that of a tube of water having a wall thickness of one inch and an inside diameter about three inches larger than the diameter of the instrument to be calibrated. While such a tube of water may actually be used, many other hydrogenous materials can be found which meet these conditions and which are mechanically better suited for such use. For example, a rubber styrene is admirably suited to this purpose as it meets the stated conditions and is extremely strong while being light in weight. On the other hand for instruments employing a gamma ray source, the tube 8 is preferably formed of a relatively dense material, such as steel.

Choice of the material of the sleeve 12 is dependent upon the type of radiation to be measured by the detector 6 as well as the type of radiation emitted by the source 4. However, in any event, the material should be such that it will alter the radiation flux sufficiently to provide the desired difference when the sleeve 12 is moved from position 34 to position 36. The only dimensional requirement for the sleeve 12 is that it fit slidably about the instrument 2 within the tube 8. Polyethylene containing a large amount of boron, has been found to be quite satisfactory for both neutron and gamma ray detecting instruments employing a neutron source. With this construction, when the sleeve 12 is in its inoperative position 34, neutrons from the source 4 of the instrument 2 are scattered and slowed down by the tube 8 and are returned to the detector 6. However, when the sleeve 12 is raised to position 36 the neutrons from source 4 will be scattered and slowed down by the tube 8 but a substantial number must pass through the sleeve 12 in order to reach the detector 6. Since the sleeve 12 has a high boron content, a large percentage of the slowed neutrons will be captured and the neutron flux reaching the detector 6 will be reduced. As stated previously, when sleeve 12 is in its inoperative position 34 neutrons from the source 4 of the instrument 2 are scattered and slowed down by the tube 8. Some of the slowed neutrons are captured in the material of tube 8 and in the materials of the instrument 2 giving rise to gamma radiation which reaches the detector 6. However, when the sleeve 12 is raised to position 36 a large percentage of the slowed neutrons will be captured in the sleeve 12. Consequently the gamma ray flux reaching the detector 6 will be altered. Thus, regardless of the type of radiation detected the desired difference is established.

With instruments employing a gamma ray source, the sleeve 12 is preferably composed of a material having a high atomic number, such as lead. This will absorb much of the gamma ray flux and will provide the desired difference when it is moved from position 34 to position 36.

To accomplish calibration, the instrument 2 is inserted through opening 24 in the top 16 of the calibrator until the lower end 20 is seated in block 18 and is centered in the opening 10 of tube 8. Clamping blocks 22 are then adjusted to center the upper end 26 of the instrument 2 with respect to the tube 8. A reading is then taken with the sleeve 12 in its inoperative position 34. Thereafter, the sleeve 12 is raised to the flux altering position 36 and a second reading may be made. Thereafter, the instrument 2 or its associated electronic system is adjusted and successive readings are made until the difference between such readings produces a desired deflection on a recording device.

If desired, several intermediate positions may be provided for the sleeve 12 thereby dividing the total difference into several smaller differences. Moreover, shielding may be provided about the outside of tube 8 to prevent extraneous radiation from reaching the detector and to eliminate any possibility of radiation danger to nearby persons or equipment. Moreover, numerous other variations and modifications may, obviously, be made without departing from the invention. Accordingly, it should be clearly understood in the figures of the accompanying drawing are illustrative only and are not intended to limit the scope of the invention.

We claim:

1. A calibrator for radioactivity well logging instruments having a source and a detector, said calibrator comprising radiation scattering means for scattering radiations emitted by said source in such a manner that radiations to which said detector is sensitive will be returned to the vicinity of said detector, and means movable axially of the instrument being calibrated between said instrument and said radiation scattering means for altering by a predetermined amount the flux of radiations reaching said detector.

2. A calibrator for radioactivity well logging instruments having a source and a detector, said calibrator comprising means responsive to irradiation by said source to direct radiations to the vicinity of said detector, and means movable axially of the instrument being calibrated between said instrument and said radiation responsive means for altering by a predetermined amount the flux of radiations reaching said detector.

3. A calibrator for radioactivity well logging instruments having a source and a detector, said calibrator comprising means responsive to radiation emitted by said source to direct radiations to the vicinity of said detector, and means movable from one position to another along the instrument being calibrated to alter the flux of radiations reaching said detector from one predetermined value to at least one other predetermined value.

4. A calibrator for radioactivity well logging instruments having a source and detector comprising a tube for receiving an instrument to be calibrated in predetermined interfitting relationship of instrument calibrator, said tube being formed of material having a high scattering cross section for the radiation emitted by said source, and means movable from one predetermined position to another to cause a predetermined change in the neutron interaction characteristics of the environment of said instrument.

5. A calibrator for radioactivity well logging instruments having a source and a detector, said calibrator comprising a tube for receiving an instrument to be calibrated in predetermined interfitting relationship of instrument to calibrator, said tube being formed of material having a high scattering cross section for the radiation emitted by said source, and a sleeve formed of material having a high radiation capture cross section arranged to encircle said instrument within said tube and movable from one predetermined position to another to cause a predetermined change in the neutron interaction characteristics of the environment of said instrument.

6. A calibrator for radioactivity well logging instruments having a source and a detector, said calibrator comprising a tube for receiving an instrument to be calibrated in predetermined interfitting relationship of instrument to calibrator, said tube being formed of material having a high energy attenuation power for the radiation emitted by said source, and a sleeve formed of material having a high capture cross section for the attenuated radiation arranged to encircle said instrument and movable within said tube from one predetermined position to another to cause a predetermined change in the neutron interaction characteristics of the environment of said instrument.

7. A calibrator for radioactivity well logging instruments having a source for emitting one type of radiation and a detector for detecting a second type of radiation, said calibrator comprising a tube for receiving an instrument to be calibrated in predetermined interfitting relationship of instrument to calibrator, said tube being formed of material having a high scattering cross section for the type of radiation emitted by said source, and a sleeve formed of material having relatively high stopping power for the type of radiation detected by said detector, said sleeve being movable from one predetermined position to another to cause a predetermined change in the neutron interaction characteristics of the environment of said instrument.

8. A calibrator for radioactivity well logging instruments having a neutron source and a radiation detector, said calibrator comprising a tube for receiving an instrument to be calibrated in predetermined interfitting relationship of instrument to calibrator, said tube being formed of material having high neutron slowing and scattering power whereby some radiations will be directed to the vicinity of said detector, and a sleeve encircling said instrument within said tube and movable from one predetermined position to another to alter the radiation flux reaching said detector.

9. A calibrator for radioactivity well logging instruments having a neutron source and a radiation detector, said calibrator comprising a tube for receiving an instrument to be calibrated in predetermined interfitting relationship of instrument to calibrator, said tube being formed of a material having high neutron slowing and scattering power whereby some radiations will be directed to the vicinity of said detector, and a sleeve formed of material having a high radiation stopping power encircling said instrument within said tube and movable from one predetermined position to another to alter the radiation flux reaching said detector by an amount which is large relative to statistical variations.

10. A calibrator for radioactivity well logging instruments having a neutron source and a radiation detector, said calibrator comprising a tube for receiving an instrument to be calibrated in predetermined interfitting relationship of instrument to calibrator, said tube being formed of hydrogenous material whereby neutrons emitted from said source will be scattered and slowed and some radiations will be directed to the vicinity of said detector, and a sleeve containing boron encircling said instrument within said tube and movable from one predetermined position to another to cause a predetermined change in the neutron interaction characteristics of the environment of said detector.

11. A calibrator for radioactivity well logging instruments having a neutron source and a radiation detector, said calibrator comprising a tube for receiving an instrument to be calibrated in predetermined interfitting relationship of instrument to calibrator, said tube being formed of rubber styrene whereby neutrons emitted by said source will be scattered and slowed and some radiations will be directed to the vicinity of said detector, and a sleeve formed of polyethylene containing boron encircling said instrument within said tube and movable from one predetermined position to another to alter the radiation flux reaching said detector by an amount which is large relative to statistical variations.

12. The method of calibrating radioactivity well logging instruments having a neutron source and a detector responsive to radiations occasioned by said source, said method comprising the steps of disposing said instrument in an environment having a neutron interaction characteristic, indicating the output signal of the detector, making a change in the neutron interaction characteristic of a predetermined amount, the change made in the neutron interaction characteristic being sufficient to produce a large change in the output signal relative to statistical variations thereof, indicating the change in the output signal of the detector thereby effected, the indicated change being a calibration difference relative to which radioactivity well logging measurements may be compared.

References Cited in the file of this patent
UNITED STATES PATENTS

| | | |
|---|---|---|
| 2,508,772 | Pontecorvo | May 23, 1950 |
| 2,522,522 | Krasnow | Sept. 19, 1950 |
| 2,666,142 | Herzog | Jan. 12, 1954 |
| 2,678,399 | Foy | May 11, 1954 |
| 2,781,307 | Wigner | Feb. 12, 1957 |
| 2,816,235 | Scherbatskoy | Dec. 10, 1957 |
| 2,837,659 | Hendee et al. | June 3, 1958 |

UNITED STATES PATENT OFFICE
CERTIFICATE OF CORRECTION

Patent No. 2,945,129                      July 12, 1960

Gilbert Swift et al.

It is hereby certified that error appears in the printed specification of the above numbered patent requiring correction and that the said Letters Patent should read as corrected below.

Column 3, line 23, for "providde" read -- provided --; column 4, line 15, for "slevee" read -- sleeve --; column 5, line 29, after "instrument" insert -- to --.

Signed and sealed this 20th day of December 1960.

(SEAL)
Attest:

KARL H. AXLINE                      ROBERT C. WATSON
Attesting Officer                  Commissioner of Patents